United States Patent [19]
Nied et al.

[11] Patent Number: 5,736,707
[45] Date of Patent: Apr. 7, 1998

[54] ELECTRIC RESISTANCE WELDING OF ELECTRIC MOTOR CAGE ROTOR ASSEMBLIES

[75] Inventors: Herman Arthur Nied, Ballston Lake; Robert Elmer Sundell, Clifton Park, both of N.Y.

[73] Assignee: General Electric Company, Schenectady, N.Y.

[21] Appl. No.: 632,810

[22] Filed: Apr. 17, 1996

[51] Int. Cl.⁶ .............. B23K 11/00; H02H 15/02
[52] U.S. Cl. ......................... 219/117.1; 29/598
[58] Field of Search ............... 219/117.1; 310/211, 310/261, 267, 270; 29/596, 598

[56] References Cited

U.S. PATENT DOCUMENTS

| | | | |
|---|---|---|---|
| 4,064,410 | 12/1977 | Roach | 310/211 |
| 4,249,098 | 2/1981 | Karlen et al. | 310/183 |
| 4,885,494 | 12/1989 | Higashi | 310/211 |
| 5,265,791 | 11/1993 | Nied et al. | 228/116 |
| 5,304,877 | 4/1994 | Baek | 310/45 |
| 5,495,133 | 2/1996 | Bawin et al. | 310/211 |

OTHER PUBLICATIONS

"Homopolar Pulse Welding for Offshore Deep Water Pipelines", by P.W. Haase et al., 27th Annual Offshore Technology Conference, pp. 105–111, May 1–4, 1995.

"Welding and Billet Heating With Homopolar Generators", by J.B. Walters et al., Metal Progress, Apr. 1985.

Primary Examiner—Matthew V. Nguyen
Attorney, Agent, or Firm—Marvin Snyder

[57] ABSTRACT

Electric resistance welding provides localized heating for simultaneous upset welding of the copper bars and copper end rings of an electric motor cage rotor assembly. Rapid application of an axial force completes the upset welds. The localized heating is in high current, low voltage pulses for which a homopolar welding generator is utilized.

6 Claims, 1 Drawing Sheet

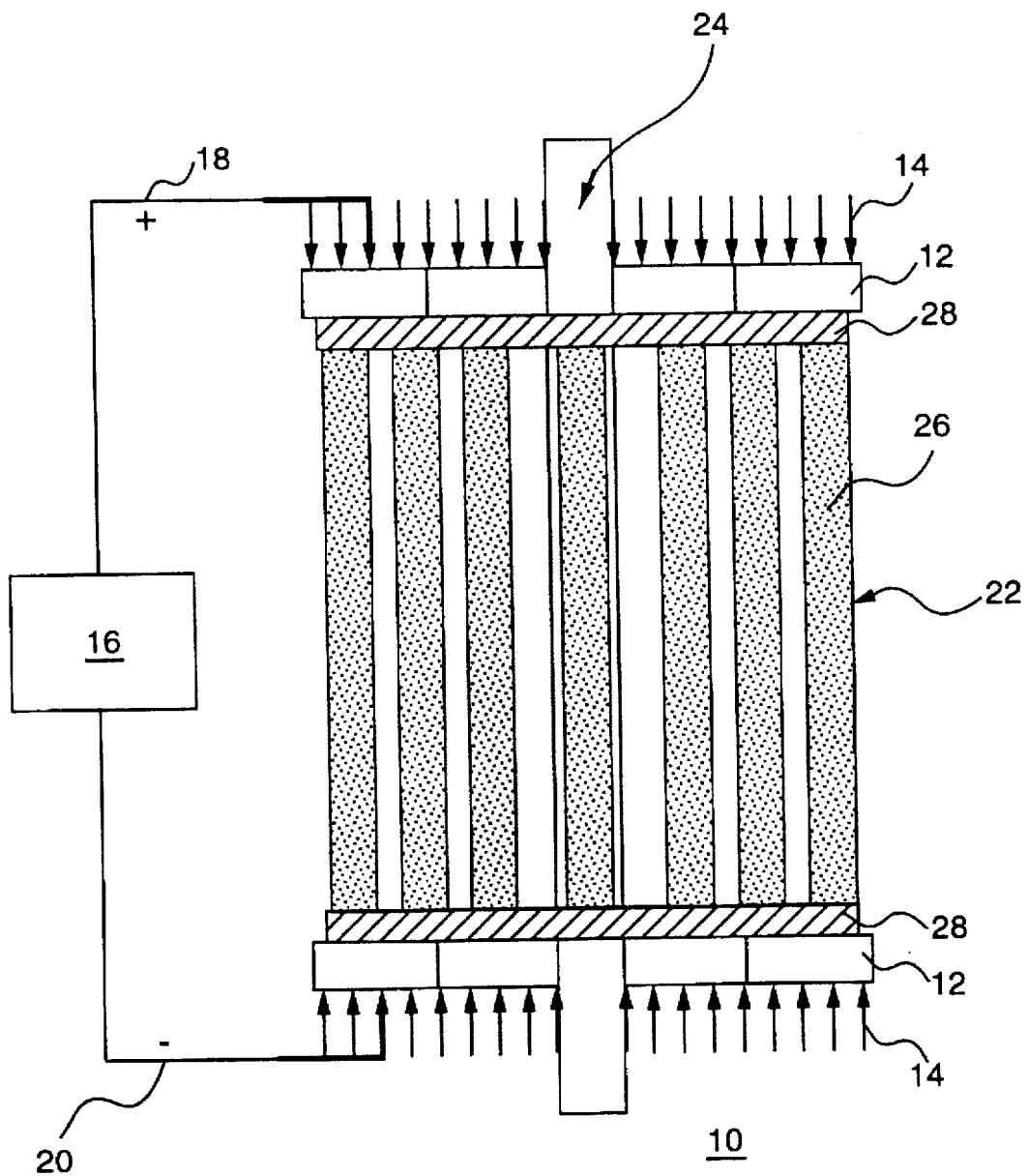

ELECTRIC RESISTANCE WELDING OF ELECTRIC MOTOR CAGE ROTOR ASSEMBLIES

BACKGROUND OF THE INVENTION

This invention relates to a method of welding electric motor cage rotor assemblies. More particularly, this invention is directed to a method of electric resistance welding of electric motor cage rotor assemblies.

The current practice for manufacturing copper rotor cages for large AC traction motors uses brazing for assembling the longitudinal copper rotor bars to the end rings. The end rings and copper bars which position the interior laminated steel core are assembled and held in a fixture for the joining operation. The difficulty in welding heavy section copper components is due to the high thermal conductivity of copper which conducts the heat away from the surface to be joined. First, the entire assembly and fixtures are placed into an oven and preheated to 650° F. After soaking to a uniform temperature, the assembly is removed from the oven and the hand brazing operation is begun. After flux has been applied, each copper bar is brazed individually to the lower end ring. When all the bars have been brazed to one end ring, the assembly is inverted and the other ends of the bars are brazed to the other end ring using a hand torch. This brazing operation is costly and time consuming. In addition, the process is susceptible to producing defects and weak brazed joints since brazing the bars singularly produces uneven heating that generates thermal stresses.

Another manufacturing method which is described in U.S. Pat. No. 4,249,098—Karlen et al. uses induction heating to attain the braze temperatures at the weld interface. This patent is incorporated herein by reference. This process is for the production of large motor cage rotors by brazing with solder the bars to copper end rings by eliminating the hand held torch and substituting induction heating for the heat source. The ends of the bars are positioned in a groove in each of the end rings. The induction heating is applied only to one section at a time of the periphery of the end ring. This method joins only two to four bar ends before the heating is applied to the next section. The rotor is indexed as each bar is brazed using localized induction heating beneath the end ring. The basic problems however still remain the same: (1) a large heat source is required to bring the interface to the brazing temperature due to the heat loss associated with the high thermal conductivity of copper, (2) the rotor bars are brazed one at a time and (3) unequal heating of the assembly leading to thermal stresses. This method joins only two to four bar ends before the heating is applied to the next section.

It is apparent from the above that there exists a need in the art for an improved method for welding such motor cages. It is a purpose of this invention to fulfill this and other needs in the art in a manner more apparent to the skilled artisan given the following disclosure.

SUMMARY OF THE INVENTION

The above-mentioned needs are met by the present invention which relates to a novel process for welding such motor cages by delivering the heat locally to all of the weld joints rapidly rather than the entire structure thereby joining all of the copper bars to the end rings in the assembly simultaneously. More particularly, the present process comprises machine toughening a first predetermined geometrical pattern on the end surfaces of the copper bars and machine toughening a second predetermined pattern on a first surface of each copper end ring, assembling the copper bars in a rotor cage configuration, positioning the copper bars against the adjoining surfaces of copper end rings to form a rotor cage, positioning fixtures against the opposite surfaces of the copper end rings, applying high current, low voltage pulses to the fixtures thereby generating welding heat at the weld interfaces between the copper bars and the copper end rings, and applying an axial force against the fixtures to provide upset welds simultaneously between the ends of the copper bars and the adjoining copper end rings thereby producing a rotor cage.

BRIEF DESCRIPTION OF THE DRAWINGS

The subject matter, which is regarded as the invention, is particularly pointed out and distinctly claimed in the concluding part of the specification. The invention, however may be best understood by reference to the following description taken in conjunction with the accompanying drawing figures in which:

FIG. 1 is a schematic view of an apparatus for practicing the electric resistance welding process of our invention.

DETAILED DESCRIPTION OF THE INVENTION

FIG. 1 shows an apparatus 10 for practicing the electric resistance welding process of our invention on an electric motor cage rotor assembly. Apparatus 10 includes a pair of opposed special holding fixtures 12 which produce opposite axial forces by pressure means (not shown) but indicate by arrows 14. Fixtures 12 hold an electric motor cage assembly in position during welding of the copper bars to the copper end rings. Fixture 12 are made of electrically conductive material.

A homopolar generator 16 is connected by leads 18 and 20 to the fixtures 12 to provide resistance heating to the weld interfaces. The homopolar generator 16 produces high current, low voltage electrical pulses for rapid resistance heating.

Homopolar generators are described in "Homopolar Pulse Welding for Offshore Deep Water Pipe Lines" by P. W. Haase et al., 1995, Offshore Technology Conference, pages 104–111. An article entitled "Welding Billet Heating with Homopolar Generators" by J. B. Walters et al. was published in "Metal Progress", April, 1985.

In U.S. Pat. No. 5,265,791—Nied and Sundell, there is disclosed and claimed solid state cold joining of metal alloy pieces wherein the joined ends are surface treated to form an integral structure. This patent which is assigned to the same assignee as the present application, is incorporated herein by reference.

In FIG. 1, an electric motor cage rotor assembly is shown at 22 positioned between fixtures 12. Rotor assembly 22 has a shaft 24 which extends through assembly 22. A cylindrical array of circumferentially spaced copper conductor bars 26 and are positioned between opposed copper end rings 28.

In current practice, the electric motor cage rotor is assembled between fixtures. The entire assembly and fixtures are placed into an oven and preheated to 650° F. After the assembly is removed from the oven, hand brazing is begun. The flux is applied and each copper bar is brazed individually to the lower end ring. The assembly is then inverted and the other ends of the bars are brazed individually to the other end ring using a hand torch.

In the practice of the process of the present invention, the opposed end surfaces of copper bars 26 and the adjacent surfaces of copper end rings 28 are machine roughed as described in U.S. Pat. No. 5,265,791 to provide predetermined geometrical patterns to increase the joint electrical resistance.

In this patent a purposely machined roughened surface is used in a way to control and enhance the local plastic deformation at elevated temperatures in order to eliminate these voids. In addition, more surface is made available by this process and dynamic grain growth would occur in both longitudinal and transverse directions at elevated temperatures. Again, the material near the center of the components to be welded experiences essential local flow and rearrangement; whereas, by conventional processing the surface material in this region has little or no displacement which results in a stagnation zone with a plane of weakness.

Components are machined by conventional machining techniques with surface patterns. Components can either be constructed of similar or dissimilar materials. Also, surface patterns can be crosswise grooves, lengthwise grooves, V-notches, spiral grooves, and/or radial serrations. It is noted that the design of the configurations must be such that when components are placed in contact with each other, patterns provide a localized strain control during the joining process which, ultimately, provides extremely high local dynamic recrystallization of the patterns. This is accomplished by placing the apexes of the patterns at right angles with respect to each other. After patterns are machined into the components respectively, the components are placed in contact with each other. A force F is applied to the components to cause a joint to be formed between the components. A weld upset greater than the combined height of patterns will eliminate any initial voids or gaps due to the surface patterns.

The ends of the copper conductor bars are machine roughened to produce a first predetermined geometrical pattern thereon. A first surface of each end ring is machine roughened to produce a second predetermined pattern thereon. The ends of the copper bars and first surfaces of the end rings are positioned so that the apexes of the patterns are at right angles with respect to each other. If desired, first and second patterns are machine roughened on opposite ends of the copper conductor bars, respectively. The first surface of one end ring is then machine roughened with a first pattern while the first surface of the other end ring is then machine roughened with a second pattern. In this latter embodiment, the ends of the copper bars and first surfaces of the end rings are positioned so that the apexes of the patterns are at right angles with respect to each other.

Bars 26 are assembled in a rotor cage configuration. The opposite ends of bars 26 are positioned against first surfaces of the opposed copper end rings 28. Special holding fixtures 12 hold rotor assembly 22 in place. High current, low voltage electric pulses are applied to assembly 22. Such pulses are provided, for example, from homopolar generator 16 through leads 18 and 20 to the fixtures 12. Sufficient electrical resistance heating is generated locally at the weld interfaces between bars 26 and end rings 28 due to the high interfacial current density produced at the multiple small contact weld joints. When the temperature at the interfaces is sufficiently high, an upset weld is produced by the rapid application of axial forces shown by arrows 14. In this manner, all of the copper bars 26 are welded simultaneously to the end rings 28 to produce an electric motor cage rotor assembly. It will be noted that local heat at the weld joint is employed as opposed to heating the entire cage assembly.

All of the bars are joined simultaneously to the end rings as opposed to individual welding of each bar end ton end ring. Further, no solder braze is required in the present invention.

While a specific embodiment of the present invention has been described, it will be apparent to those skilled in the art that various modifications can be made without departing from the spirit and scope of the invention as defined in the appended claims.

What is claimed is:

1. A method of electric resistance welding of an electric motor cage rotor assembly comprises the steps of:

providing a plurality of copper conductor bars and a pair of copper end rings, machine toughening a first predetermined geometrical pattern on the ends of the copper conductor bars, machine toughening a second predetermined pattern on a first surface of each end ring, aligning the copper conductor bars in a cylindrical array and circumferentially spaced apart between the first surfaces of the copper end rings such that the first and second patterns are substantially contacting each other along their entire patterns, applying high current, low voltage pulses to the copper end rings thereby heating simultaneously the bar and end ring interfaces to welding heat, and applying rapidly an axial force to the end rings producing an upset weld between the bars and the rings.

2. A method of electric resistance welding of an electric motor cage rotor assembly as in claim 1, wherein the step of applying high current, low voltage pulses is provided by a homopolar generator.

3. A method of electric resistance welding of an electric motor cage rotor assembly as in claim 1, wherein the step of applying rapidly an axial force is provided by a fixture adjacent a second surface of each end ring.

4. A method of electric resistance welding of an electric motor cage rotor assembly comprises the steps of:

providing a plurality of copper conductor bars and a pair of copper end rings, machine roughening first and second predetermined geometrical pattern on the opposite ends of the copper conductor bars, machine roughening a first predetermined pattern on a first surface of one end ring, aligning the copper conductor bars in a cylindrical array and circumferentially spaced apart between the first surfaces of the copper end rings such that the first and second patterns are substantially contacting each other along their entire patterns, applying high current, low voltage pulses to the copper end rings thereby heating simultaneously the bar and end ring interfaces to welding heat, and applying rapidly an axial force to the end rings producing an upset weld between the bars and the rings.

5. A method of electric resistance welding of an electric motor cage rotor assembly as in claim 4, wherein the step of applying high current, low voltage pulses is provided by a homopolar generator.

6. A method of electric resistance welding of an electric motor cage rotor assembly as in claim 4, wherein the step of applying rapidly an axial force is provided by a fixture adjacent a second surface of each end ring.

\* \* \* \* \*